United States Patent [19]
Lovering

[11] 4,083,640
[45] Apr. 11, 1978

[54] BUILDERS SCAFFOLDING

[75] Inventor: Dennis William Lovering, Pattingham, England

[73] Assignee: Kwikform Limited, Birmingham, England

[21] Appl. No.: 741,693

[22] Filed: Nov. 15, 1976

[30] Foreign Application Priority Data

Nov. 14, 1975 United Kingdom ............... 46977/75

[51] Int. Cl.² ................................................ F16B 7/00
[52] U.S. Cl. .................................... 403/246; 182/179; 403/49
[58] Field of Search ................. 403/49, 189, 246, 245, 403/230, 187; 182/178, 179

[56] References Cited
U.S. PATENT DOCUMENTS

| 270,051 | 1/1883 | Goebel | 403/246 X |
|---|---|---|---|
| 3,179,212 | 4/1965 | Gostling | 403/49 X |
| 3,420,557 | 11/1969 | Francis et al. | 182/179 X |
| 3,817,641 | 6/1974 | Steele et al. | 182/179 X |

*Primary Examiner*—Andrew V. Kundrat
*Attorney, Agent, or Firm*—Beall & Jeffery

[57] ABSTRACT

In builders scaffolding of the kind wherein cross-members are detachably connected to upright members by connecting means comprising a plurality of open-ended vertically disposed sockets on the upright member and connector means on the cross-members each comprising a pair of vertically spaced limbs adapted to embrace a selected socket member, with a wedge clamping member driven through aligned openings in the limbs of the connector member and through the socket to press the end faces of the limbs into engagement with the upright member, an improved connector member in which the two limbs are spaced apart by a distance sufficient to receive a socket therebetween with only a small clearance, at least the upper limb affording a cavity at its underside to accommodate a retaining formation which is provided on the lowermost end of the wedge clamping member so that the latter may be raised to a releasing position in which its lowermost end is clear of the space between the two limbs.

10 Claims, 8 Drawing Figures

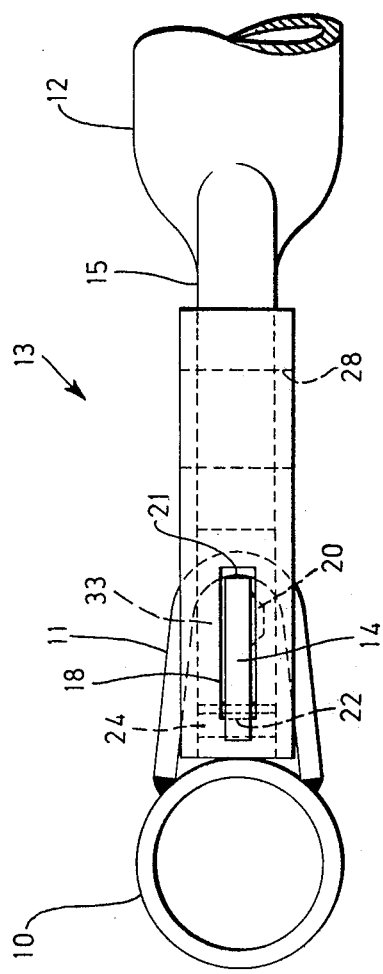
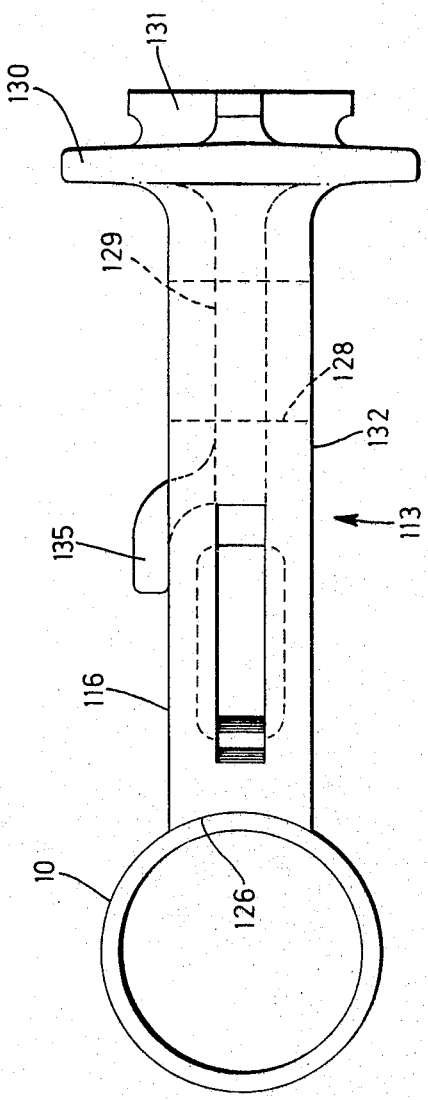
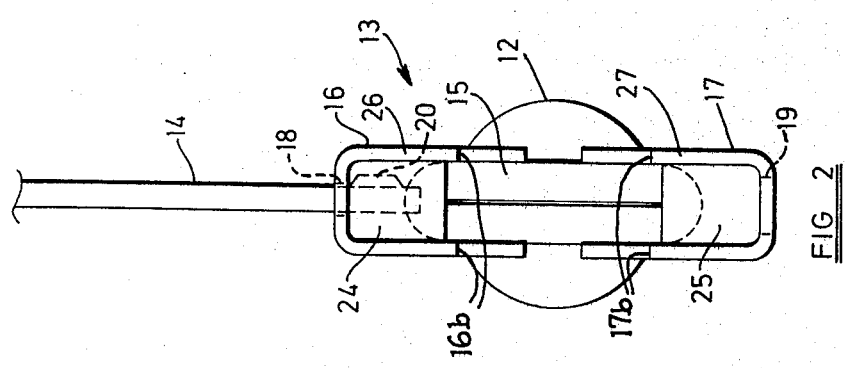

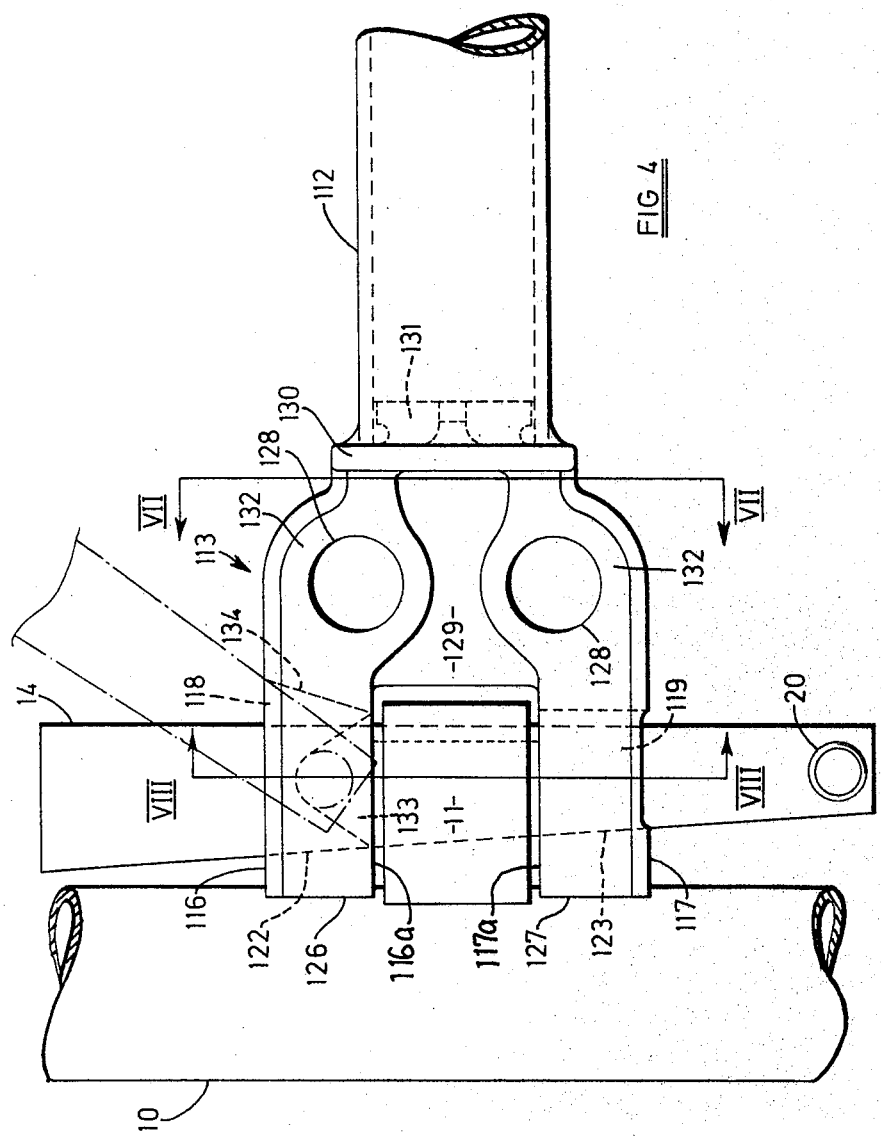

BUILDERS SCAFFOLDING

BACKGROUND OF THE INVENTION

1. Field of the Invention

This invention relates to builders scaffolding of the kind which comprises an upright member, a cross-member and connecting means for detachably connecting the upright member and cross-member together, wherein the connecting means comprises a socket mounted on the exterior of the upright member, the socket being open at each of its two opposite ends which are spaced apart along the length of the upright member, the connecting means further comprising connector means provided at or near one end of the cross-member and including two limbs which in the operative position are spaced apart vertically to permit of the upright member socket being received therebetween, each limb having an abutment face adapted to abut against the upright member, each limb further being provided with an opening which receives a wedge clamping member forming part of the connecting means, the arrangement being such that in connecting the cross-member to the upright member the two limbs of the connector means are disposed vertically spaced apart and straddle the socket with the wedge clamping member extending through the two open ends of the socket in pressure-engagement with an edge of the opening of each of the two limbs which is nearest to the upright member and also with an internal clamping face of the socket, in such a manner that the said abutment faces of the two limbs are brought into pressure-engagement with the upright member at positions above and below the socket. Such scaffolding is hereinafter referred to as being of the kind specified and is the subject of our British Pat. No. 1,180,562.

2. Description of the Prior Art

In the previous arrangement the wedge clamping member is provided with a retaining formation on the lowermost end portion thereof, and in its raised position, the lowermost end portion of the wedge clamping member remains beneath the upper limb of the connector means, and in order to enable the connector means to straddle the socket the two limbs were spaced apart by a distance substantially greater than the corresponding dimension of the socket.

SUMMARY OF THE INVENTION

The present invention resides in an improvement in builders scaffolding of the kind specified wherein at least the in situ uppermost one of the two limbs of said connector means provided at the end of the cross-member is upwardly recessed from its underside to define a cavity adapted to receive the lowermost end position of the wedge clamping member when in its raised position and to accommodate therein a retaining formation which is provided on said lowermost end portion to render the wedge clamping member captive relative to said connector means, the spacing between the two limbs of said connector means being such as to receive said socket therebetween with only a small clearance. The present invention enables the limbs of the connector means to embrace the socket closely, and thereby improve the rigidity of the connection, whilst still enabling the wedge clamping member to be captively associated with the connector means.

In accordance with a further feature of the invention, the abutment face of the uppermost limb has a vertical dimension (that is to say in a direction parallel to the wedge clamping member) which is substantially equal to or greater than the depth of said cavity. Conveniently, this is achieved by forming said limb to an inverted U-shape in transverse section, said cavity being defined by the interior of said section, and the abutment face being likewise generally of inverted U-shape in elevation.

Such increase in the vertical dimension of the abutment face further enhances the rigidity of the joint, and preferably both limbs of the connector means are of similar form, the lower limb conveniently being arranged with its cavity facing the cavity of the upper limb. In such an arrangement, the connector means may be formed as a fabrication comprising a pair of said U-section limbs secured, as by welding, to a plate-like part provided at the end of the cross-member, the upper and lower margins of said plate-like part being accommodated with the channel of said U-section limbs, at the end of those limbs remote from the abutment faces. Where the cross-member is of tubular form, such plate-like part may be formed as a locally flattened end portion thereof.

Abutment blocks may be provided within the two limbs adjacent the free ends thereof for engagement by the wedge clamping member.

In an alternative arrangement the connector means may be formed as a casting comprising a body integral with the two limbs. In this case, the body may be formed with a spigot adapted to enter the end of a hollow tubular scaffolding member (i.e. the cross-member) for the purpose of securing the connector means to the cross-member.

BRIEF DESCRIPTION OF THE DRAWINGS

The invention will now be described by way of example with reference to the accompanying drawings wherein:

FIG. 2 is a view in end elevation of the cross-member of FIG. 1 provided with the connector means;

FIG. 3 is a plan view corresponding to FIG. 1;

FIGS. 4 to 6 are views corresponding respectively to FIGS. 1 to 3 showing a second embodiment of connecting means.

DESCRIPTION OF THE PREFERRED EMBODIMENTS

Figure 5:
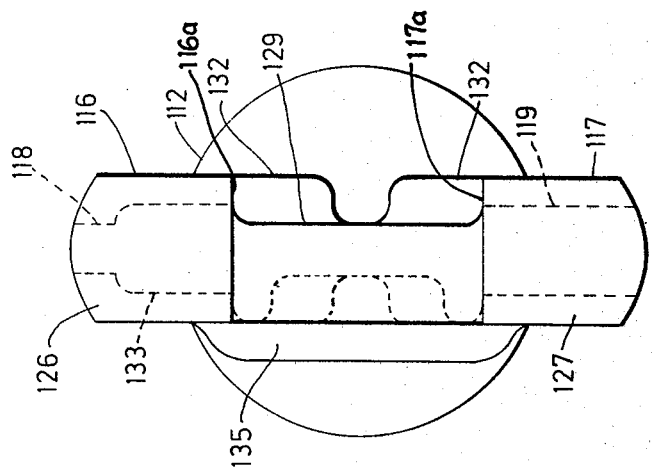
Figure 7:
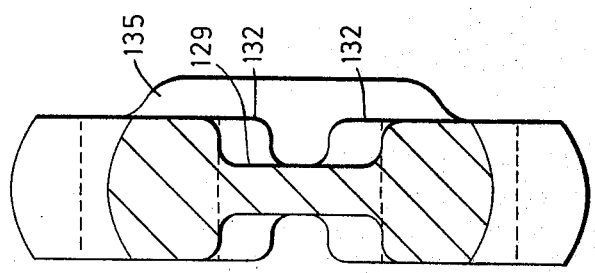
FIGS. 7 and 8 are respectively vertical sections on the lines VII—VII and VIII—VIII of FIG. 4.
Figure 8:
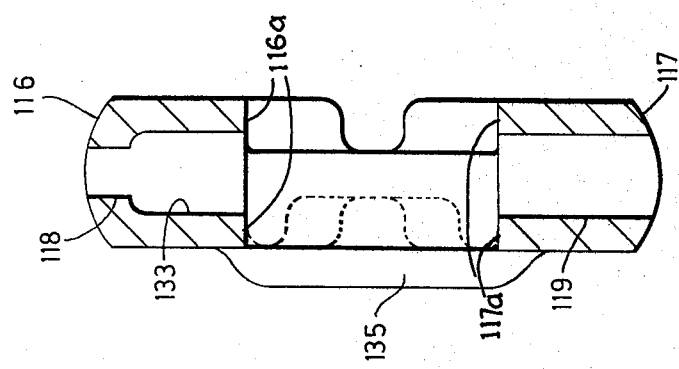

In the accompanying drawings there is shown a single connection between a scaffolding upright 10 and a horizontally extending cross-member 12 or 112. The upright 10 is provided, in known manner, with sockets 11 at spaced intervals along its length, only one such socket being shown in the accompanying drawings. Each socket consists of a generally U-shaped strip of metal which is welded or otherwise secured to the exterior surface of the upright 10 so as to define a socket which is open at both ends. Each such socket forms part of a connecting means which additionally comprises connector means, indicated generally at 13 in FIGS. 1 to 3 and at 113 in FIGS. 4 to 6, at the end of a cross-member such as 12, and a wedge clamping member 14 which is captively associated with such connector means.

Figure 1:
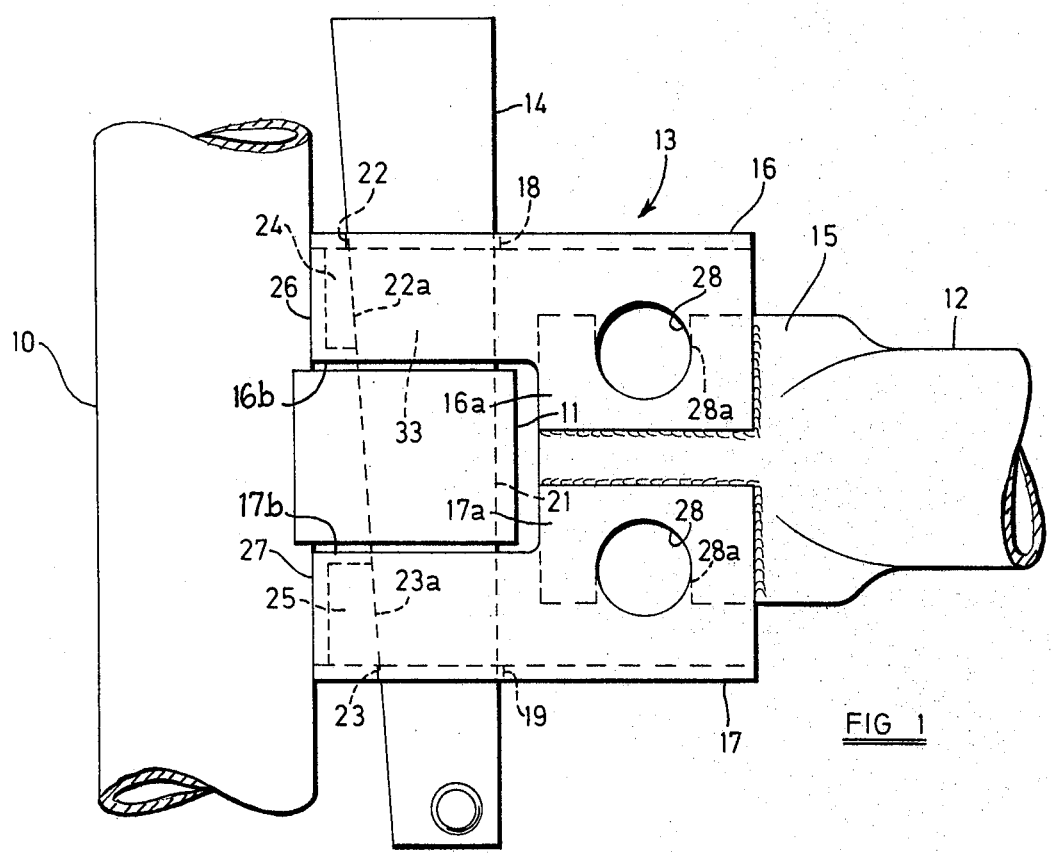
FIG. 1 is a view in side elevation showing a connection between an upright member and a cross-member utilizing a first embodiment of connecting means in accordance with the present invention.

In the embodiment illustrated in FIGS. 1 to 3, the cross-member 12 is of round tubular form and includes a flattened end portion 15. The upper and lower marginal edges of the flattened portion 15 are received within the interior of respective U-section limbs 16 and 17 and secured therein, for example by welding. The spacing between socket engaging surfaces 16b and 17b of the upper and lower limbs 16 and 17 where they protrude beyond the end portion 15 is only slightly greater than the vertical depth of the socket 11 so as to be capable of being assembled therewith. However where the limbs 16 and 17 embrace the end portion 15, the sides thereof are of increased depth as indicated at 16a and 17a respectively.

The wedge clamping member 14 extends through a narrow slot 18 in the upper limb 16 and through a somewhat wider slot 19 in the lower limb 17. The lowermost end portion of the wedge clamping member 14 is formed with a lateral protrusion 20 which can pass through the slot 19 but not through the slot 18. In use, as seen in FIG. 1, the wedge clamping member 14 extends through the socket 11 so that the edge thereof remote from the upright 10 engages the internal surface of the socket 11 where indicated at 21, whilst the edge of the wedge clamping member 14 nearest the upright 10 engages the ends 22 and 23 of the slots 18 and 19 nearest the upright. The wedge clamping member 14 also engages appropriately inclined faces 22a and 23a, respectively aligned with the ends 22 and 23 of the slots, afforded by abutment pieces 24 and 25 secured within the limbs 16 and 17 adjacent to the free ends thereof.

The connecting means is so arranged that the end faces 26 and 27 of the limbs 16 and 17 furthest from the cross-member 12 are thereby brought into pressure-engagement with the exterior surface of the upright 10.

To release the connection, the wedge clamping member 14 is withdrawn upwardly through the socket 11 until the protrusion 20 is disposed within the cavity 33 afforded by the inverted U-section upper limb 16. In this position, the wedge clamping member may be inclined outwardly away from the upright 10 into a stable position in which its center of gravity is outside the length of the slot 18. In this condition, the cross-member 12 can be laterally withdrawn from the socket 11.

The limbs 16 and 17 are formed with aligned holes 28 in their sides, as seen in FIG. 1, which register with openings 28a formed in the upper and lower margins respectively of the flattened end portion 15 for the attachment of diagonal bracing members (not shown).

It will be understood that although cross-member 12 is described above as being a horizontal member, it could alternatively extend in an inclined plane if so desired, and for this purpose the limbs could be secured to a plate extending parallel to the end portion 15 and pivotally connected thereto about an axis perpendicular thereto.

If desired it would be possible to modify the upper limb 16 by providing thereon a pair of downwardly directed lips to engage the socket member 11 either internally or externally in order to assist in the lateral location of the cross-member while it is being assembled with the upright. In this case the lips should preferably be shallow so as to minimise the consequential increase necessitated in the vertical spacing of the two limbs 16 and 17.

In the embodiments illustrated in FIGS. 4 to 8, the cross-member 112 is again of round tubular form but does not have the flattened end portion. Instead, the connector means 113 comprises a casting including a flat body or web 129 which extends perpendicularly from a disc 130 carrying a short spigot 131 adapted to enter the end of the cross-member 112 and be secured for example by welding.

Adjacent to its upper and lower edges, the web 129 is formed on each side with pairs of laterally projecting bosses 132 affording through holes 128 which serve the same purpose as the holes 28 of the previously described embodiment. The bosses 132 are formed with integral extensions which protrude beyond the web 129 to form a pair of spaced parallel limbs 116 and 117 which are adapted to embrace a socket 11 with only a slight clearance between the socket engaging surfaces 116a and 117a as shown in FIG. 4.

The upper limb 116 is provided with a through slot 118 having a transverse width only slightly greater than the thickness of the wedge member 14. The lower limb 117 is formed with a relatively wider slot 119 such that the protrusion 20 of the wedge member 14 can pass through the lower slot 119 but not through the upper slot 118. However, to accommodate the protrusion 20, the upper limb 116 is formed at its underside with a cavity 133 formed by lateral extensions of the slot 118. Thus, the wedge member 14 can be raised to the position shown in chain-dot lines in FIG. 4, with the protrusion 20 within the recess 133 and with the straight edge of the wedge member resting against the end 134 of the slot 118 remote from the upright 10. As can be seen, this end of the slot 118 is inclined upwardly from the upright member 10 so as to ensure that the angle at which the wedge member 14 is inclined is such that its centre of gravity is outside the length of the slot 118.

As can be seen from FIG. 4, the ends 122 and 123 of the slots 118 and 119 respectively nearer to the upright member 10 are inclined at an angle complementary to the tapered face of the wedge member 14 so that when the wedge member is driven through the socket member 11 and the slots 118 and 119 the connector member 113 as a whole is urged towards the upright member 10 so that the curved end faces 126 and 127 of the limbs 116 and 117 are in pressure engagement with the outer surface of the upright member.

To assist in the location of the connector member 113 on a socket member 11, the web 129 may be formed with a curved lip 135 which is offset laterally therefrom and adapted to engage the socket member 11 externally in such a manner that the slots 118 and 119 are then laterally aligned with the hollow interior of the socket member.

Although the cross-member 112 is described above as being a horizontal member, it could alternatively extend in an inclined plane if so desired. For this purpose, the end portions of the cross-member 112 could be bent relative to the main length thereof, or alternatively the body of the connector member 113 could be modified so that the disc 130 and spigot 131 are arranged on an axis which is inclined relative to the lengths of the limbs 116 and 117 instead of being parallel thereto.

It will also be appreciated that the upper limb 116 could be modified by the provision of a pair of downwardly directed lips as previously described in relation to the first embodiment .

I claim:

1. In builders' scaffolding of the kind which comprises an upright member, a cross-member and connecting means for detachably connecting the upright member and cross-member together, wherein the connecting means comprises a socket member mounted on the exterior of the upright member, the socket member being open at each of its two opposite ends which are spaced apart along the length of the upright member, the connecting means further comprising a wedge clamping member and a co-operative connector member provided at or near one end of the cross-member, the connector member including two limbs each having a socket engaging surface which in the operative position are spaced apart vertically to permit of the socket member of the upright member being received between said surfaces, each limb having an abutment face adapted to abut against the upright member, each limb further being provided with an opening which receives the wedge clamping member as it extends through the two open ends of the socket member in pressure-engagement with an edge of the opening of each of the two limbs which is nearest to the upright member and also with an internal clamping face of the socket member, in such a manner that the said abutment faces of the two limbs are brought into pressure-engagement with the upright member at positions above and below the socket member, the wedge clamping member being provided with a laterally projecting retaining formation adjacent to its lower end, the wedge member-receiving opening in the in situ uppermost one of said limbs of the connector member provided on the end of the cross-member has a width such that said retaining formation cannot pass through said opening thereby to render the wedge clamping member captive, the other opening of said connector member has a width such that the retaining formation is able to pass through to enable the wedge clamping member to be driven downwardly through the socket member with which the connector member is assembled, the invention wherein the in situ uppermost one of the two limbs of said connector member is upwardly recessed from its socket engaging surface to define a cavity adapted to receive the lowermost end portion of the wedge clamping member and the retaining formation thereon when the wedge clamping member is in a raised position, the spacing between the socket engaging surfaces of said connector means being such as to receive said socket member therebetween with only a small clearance.

2. Builders scaffolding according to claim 1 wherein the abutment face of the uppermost limb has a vertical dimension which is substantially equal to or greater than the depth of said cavity.

3. Builders scaffolding according to claim 2 wherein the upper limb is of inverted U-shape in transverse section, said cavity being defined by the interior of said section, and the abutment face being of generally inverted U-shape in elevation.

4. Builders scaffolding according to claim 1 wherein the connector means comprises a body integral with the two limbs.

5. Builders scaffolding according to claim 4 wherein the cavity at the underside of the upper limb is formed as at least one lateral extension of the slot formed in that limb.

6. Builders scaffolding according to claim 4 wherein the ends of the slots nearest the respective abutment faces are inclined to the plane defined by said abutment faces at an angle complementary to that of the tapered edge of the wedge clamping member.

7. In builders' scaffolding of the kind which comprises an upright member, a cross-member and connecting means for detachably connecting the upright member and cross-member together, wherein the connecting means comprises a socket member mounted on the exterior of the upright member, the socket member being open at each of its two opposite ends which are spaced apart along the length of the upright member, the connecting means further comprising a wedge clamping member and a co-operative connector member provided at or near one end of the cross-member, the connector member including two limbs which in the operative position are spaced apart vertically to permit of the socket member of the upright member being received between, each limb having an abutment face adapted to abut against the upright member, each limb further being provided with an opening which receives the wedge clamping member as it extends through the two open ends of the socket member in pressure-engagement with an edge of the opening of each of the two limbs which is nearest to the upright member and also with an internal clamping face of the socket member, in such a manner that the said abutment faces of the two limbs are brought into pressure-engagement with the upright member at positions above and below the socket member, the invention wherein the wedge clamping member is provided with a laterally projecting retaining formation adjacent to its lower end, the wedge member-receiving opening in the in situ uppermost one of said limbs of the connector member provided on the end of the cross-member has a width such that said retaining formation cannot pass through said opening thereby to render the wedge clamping member captive, the other opening of said connector member has a width such that the retaining formation is able to pass through to enable the wedge clamping member to be driven downwardly through the socket member with which the connector member is assembled, and the in situ uppermost one of the two limbs of said connector member is upwardly recessed from its underside to define a cavity adapted to receive the lowermost end portion of the wedge clamping member and the retaining formation thereon when the wedge clamping member is in a raised position, the spacing between the two limbs of said connector means being such as to receive said socket member therebetween with only a small clearance, wherein the abutment face of the uppermost limb has a vertical dimension which is substantially equal to or greater than the depth of said cavity, the upper limb being of inverted U-shape in transverse section, said cavity being defined by the interior of said section and the abutment face being of generally inverted U-shape in elevation, and wherein the lower limb is of U-shape in transverse section and said two limbs are secured in spaced parallel relation to a plate-like part provided at the end of the cross-member, the upper and lower margins of said plate-like part being accommodated within the channel of said U-section limbs, at the end of those limbs remote from the abutment faces thereof.

8. Builders scaffolding according to claim 7 wherein abutment blocks are disposed within the U-section limbs at positions between the slots and the abutment faces, said abutment blocks affording inclined faces aligned with the ends of the slots nearest the abutment faces.

9. In builders' scaffolding of the kind which comprises an upright member, a cross-member and connecting means for detachably connecting the upright member and cross-member together, wherein the connecting means comprises a socket member mounted on the exterior of the upright member, the socket member being open at each of its two opposite ends which are spaced apart along the length of the upright member, the connecting means further comprising a wedge clamping member and a co-operative connector member provided at or near one end of the cross-member, the connector member including two limbs which in the operative position are spaced apart vertically to permit of the socket member of the upright member being received between, each limb having an abutment face adapted to abut against the upright member, each limb further being provided with an opening which receives the wedge clamping member as it extends through the two open ends of the socket member in pressure-engagement with an edge of the opening of each of the two limbs which is nearest to the upright member and also with an internal clamping face of the socket member, in such a manner that the said abutment faces of the two limbs are brought into pressure-engagement with the upright member at positions above and below the socket member, the invention wherein the wedge clamping member is provided with a laterally projecting retaining formation adjacent to its lower end, the wedge member-receiving opening in the in situ uppermost one of said limbs of the connector member provided on the end of the cross-member has a width such that said retaining formation cannot pass through said opening thereby to render the wedge clamping member captive, the other opening of said connector member has a width such that the retaining formation is able to pass through to enable the wedge clamping member to be driven downwardly through the socket member with which the connector member is assembled, and the in situ uppermost one of the two limbs of said connector member is upwardly recessed from its underside to define a cavity adapted to receive the lowermost end portion of the wedge clamping member and the retaining formation thereon when the wedge clamping member is in a raised position, the spacing between the two limbs of said connector means being such as to receive said socket member therebetween with only a small clearance, the connector means comprising a body integral with the two limbs, and wherein the body of the connector means is formed with respective pairs of laterally protruding bosses adjacent to its upper and lower margins, such bosses being formed with through holes, and the limbs are formed as integral extensions of the bosses.

10. A cross-member for use in builders' scaffolding of the kind which comprises an upright member provided with a socket member mounted on the exterior thereof, the socket member being open at each of its two ends which are spaced apart along the length of the upright member, wherein at each end said cross-member is provided with a respective wedge clamping member and a respective connector member; each connector member including two limbs each having a socket engaging surface which in the operative position are spaced apart vertically to permit of the socket member of the upright member being received between said surfaces, each limb having an abutment face adapted to abut against the upright member, each limb being provided with an opening which receives the wedge clamping member to enable it to extend through the two open ends of the socket member when the connecting member is assembled therewith with the wedge clamping member in pressure-engagement with an edge of each opening and an opposed internal face of the socket so as to bring the abutment faces of the two limbs into pressure-engagement with the upright member at positions above and below the socket member; each wedge clamping member having a laterally projecting retaining formation adjacent to its in situ lower end, the wedge member-receiving opening in the in situ uppermost limb of each connector member having a width such that said retaining formation cannot pass through said opening thereby to render said wedge clamping member captive, the other opening of each connector member having a width such that the retaining formation is able to pass through to enable the wedge clamping member to be driven downwardly through a socket member when the connector member is assembled therewith; and the in situ uppermost one of the two limbs of each of said connector means is upwardly recessed from its socket engaging surface to define a cavity adapted to receive the lowermost end portion of the wedge clamping member and the retaining formation thereon when the wedge clamping member is in a raised position in which the lowermost end portion of the wedge clamping member is withdrawn clear of the space between the socket engaging surfaces.

* * * * *